INVENTORS
NICHOLAS J. CURTO
JAMES E. HENRY
ATTORNEYS

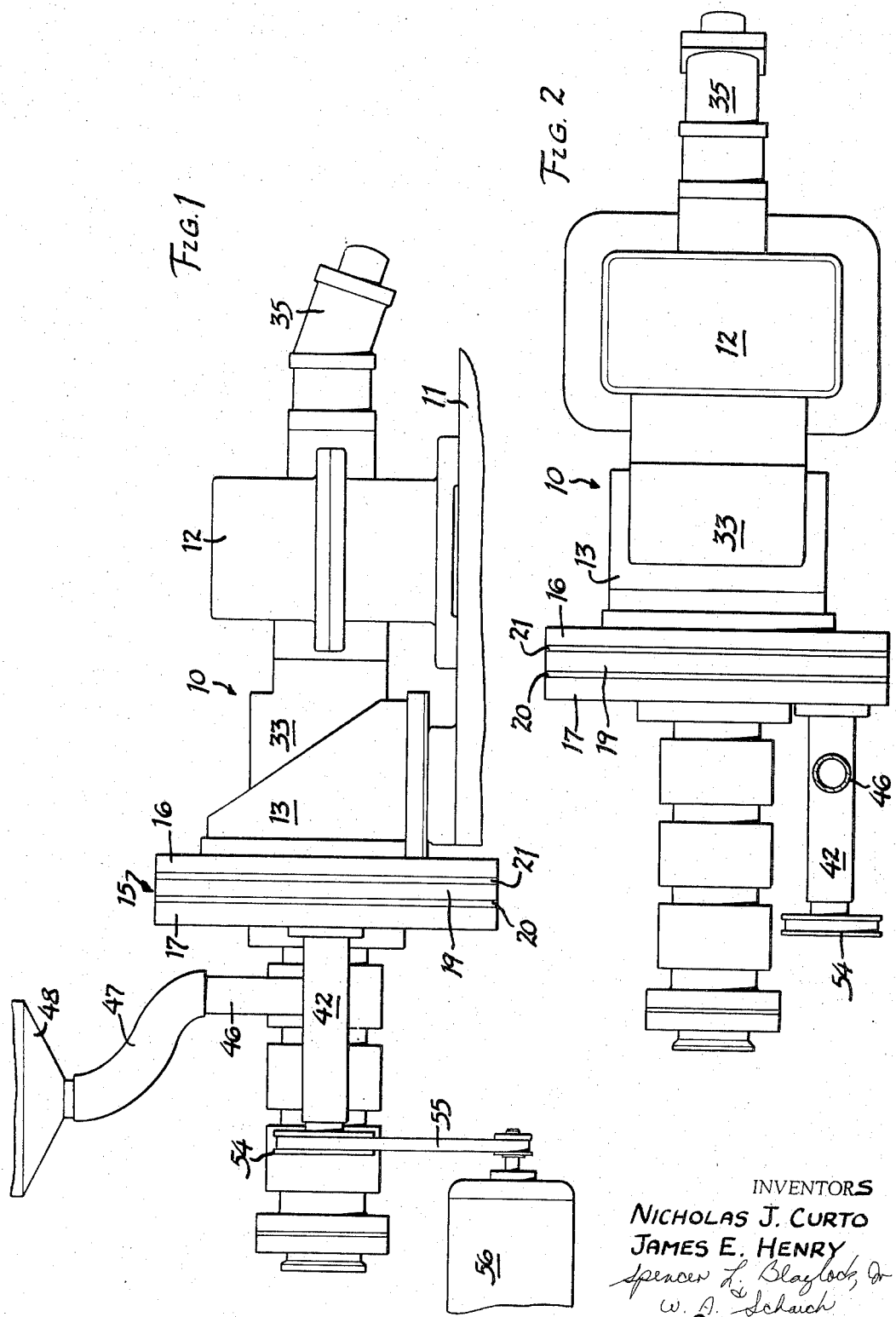

United States Patent Office 3,351,694
Patented Nov. 7, 1967

3,351,694
METHOD AND APPARATUS FOR EXTRUDING
THERMOPLASTIC MATERIAL
Nicholas J. Curto, Toledo, Ohio, and James E. Henry,
Bound Brook, N.J., assignors to Owens-Illinois Inc., a
corporation of Ohio
Filed Mar. 4, 1964, Ser. No. 349,241
5 Claims. (Cl. 264—176)

The present invention relates to an elastic melt extruder and to a method of operating such an extruder. More particularly, this invention relates to an elastic melt extruder in which solid plastic material is fed to a shearing gap by an external feeding means.

There has been recently developed a new type of plasticizer-extruder, commonly known as an "elastic melt extruder" utilizing "the normal force effect," i.e., the normal force developed when a visco-elastic material is sheared between a rotating plate and a stationary plate, to perform the functions of a conventional plasticizer-extruder. Such an elastic melt extruder is described in detail in "Modern Plastics Magazine" of October 1959, at page 107, in an article by Bryce Maxwell and Anthony J. Scalora.

A conventional elastic melt extruder utilizes a power-driven, rotatable disc operable within a convolute chamber defined between the rotatable disc and a fixed disc and to which solid plastic material is furnished from a supply hopper or the like. The confronting radial faces of the discs are spaced through a narrow gap, and one of the discs, usually the fixed disc has an exit orifice axially aligned with the disc. As the one disc is rotated, the thermoplastic material introduced peripherally of the disc and confined between the radial shearing faces of the discs and the orifice plate is subjected to shearing forces. The thermoplastic material is essentially elastic and the tendency of the sheared material for elastic recovery after arcuate shearing and stretching between the radial faces effects centripetal flow of material between the discs toward the central orifice, the material issuing from the orifice in plasticized condition at a predetermined pressure.

In a conventional elastic melt extruder, as above described, the solid plastic material is fed to the shearing gap by gravity flow from an overhead hopper. During the operation of such conventional devices, the granulated solid material may bridge over the entrance passage to the shearing gap to interrupt, at least momentarily, the uniform feeding of the material. Further, it is difficult to obtain uniform feeding peripherally of the shearing gap.

The present invention prevents these difficulties by providing an improved positive feed means for insuring the constant, peripheral flow of plastic material to the shearing gap. Additionally, the positive feeding of solid plastic material to the gap results in the issuance of plastic material at pressures generally higher than those generated in conventional elastic melt extruders.

The problems of feeding the particulate, unplasticized material to the melt chamber or "gap" may be further complicated by the utilization of the particulate material in various forms, i.e., as pellets, powders or flakes. Additionally, any successful feed system must be capable of utilization with various types of thermoplastic materials, such as high density polyethylene, low density polyethylene, nylon, polystyrene, polypropylene, and polyvinyl chloride. When the variations in the form and density of the particulate material are combined with the variations in the material, some system of positive feeding is critical in order to obtain consistent, high volume output from an extruder of the elastic melt or centripetal type.

The present invention now provides a new and novel feeding mechanism and method, capable of consistent, high volume introduction of particulate or unplasticized material into the melt chamber. Specifically, the present invention contemplates the introduction of the particulate material into the chamber through one of the relatively rotatable discs or plates between which the chamber is defined. Usually, one of the plates is fixed, and this plate normally defines, at its inner surface, one of the walls of the melt chamber. By perforating this fixed plate, an opening is provided directly into the chamber in opposing relationship to the melt chamber face of the rotatable plate. The aperture is located at a peripheral portion of the melt chamber. This aperture communicates through a suitable conduit with a source of particulate, or unplasticized materials, and the material is introduced from the source, through the conduit, and into the chamber in any desired fashion.

One particularly desirable arrangement utilizes a feed screw with the conduit being formed as a cylindrical barrel communicating at one end with the aperture and communicating in spaced relation thereto with a supply hopper or the like. The screw is of substantially constant lead and pitch, and serves to convey the particulate material into and through the aperture with sufficient momentum, and with sufficient mechanical advantage, to insure the rapid, smooth introduction of the material into the melt chamber.

By rotating the screw at a relatively high speed the material can be introduced into the chamber with sufficient momentum to directly impinge the material upon the melt chamber face defined by the rotatable disc or plate, the material entering the chamber in a substantially straight line and being deflected by its contact with the plate, or with material on the face of the plate, into the spiral path which finally results in the material being extruded from the axial orifice in a plasticized state.

Although the invention is disclosed and described with particular reference to the utilization of the rotatable feed screw for advancing the material, it will be obvious that other forms of mechanism can be utilized to so advance the material. For example, the material may be advanced by means of fluid pressure, such as in an air stream, the material can be advanced by a reciprocating piston, or a centrifugal thrower can be utilized if desired.

Thus, it is an object of the present invention to provide a new and improved method of an apparatus for introducing particulate material into an elastic melt extruder, thereby increasing the output efficiency and operational consistency of such an extruder.

Another important object of the present invention is to provide a method of introducing particulate thermoplastic material into an elastic melt extruder melt chamber to be plasticized therein, the material being introduced through one of the relatively rotatable plates defining the melt chamber at a peripheral portion of the chamber and in a direction generally parallel to the axis of rotation of the plates, the material being deflected into a path normal to the axis of plate rotation only after the material has been introduced into the chamber.

It is a further important object of the present invention to provide an apparatus for increasing the efficiency of an elastic melt extruder by introducing particulate, unplasticized material into the melt chamber at a peripheral portion of the chamber and through an aperture formed in one of the relatively rotatable plates defining the chamber, the aperture communicating with a source of particulate material, means being provided intermediate the source and the aperture to forcibly displace material through the aperture and into the chamber.

It is another, and no less important, object of the present invention to provide an improved elastic melt extruder wherein a pair of relatively rotatable plates define therebetween an elastic melt chamber from which plasticized material issues through an orifice coaxial with the axis of rotation of the plates, and wherein one of the plates is apertured to provide for the ingress of unplasticized material into the chamber, a conduit being provided interconnecting the aperture and a source of unplasticized material, and a rotatable helical feed screw being disposed in the conduit to advance material from the source through the conduit and the aperture and into the chamber.

Other objects of this invention will appear in the following description and appended claims, reference being had to the accompanying drawings forming a part of this specification wherein like reference characters designate corresponding parts in the several views.

On the drawings:

FIGURE 1 is a side elevational view of an elastic melt extruder mechanism of the present invention;

FIGURE 2 is a plan elevational view of the mechanism of FIGURE 1;

As shown on the drawings:

Figure 4:
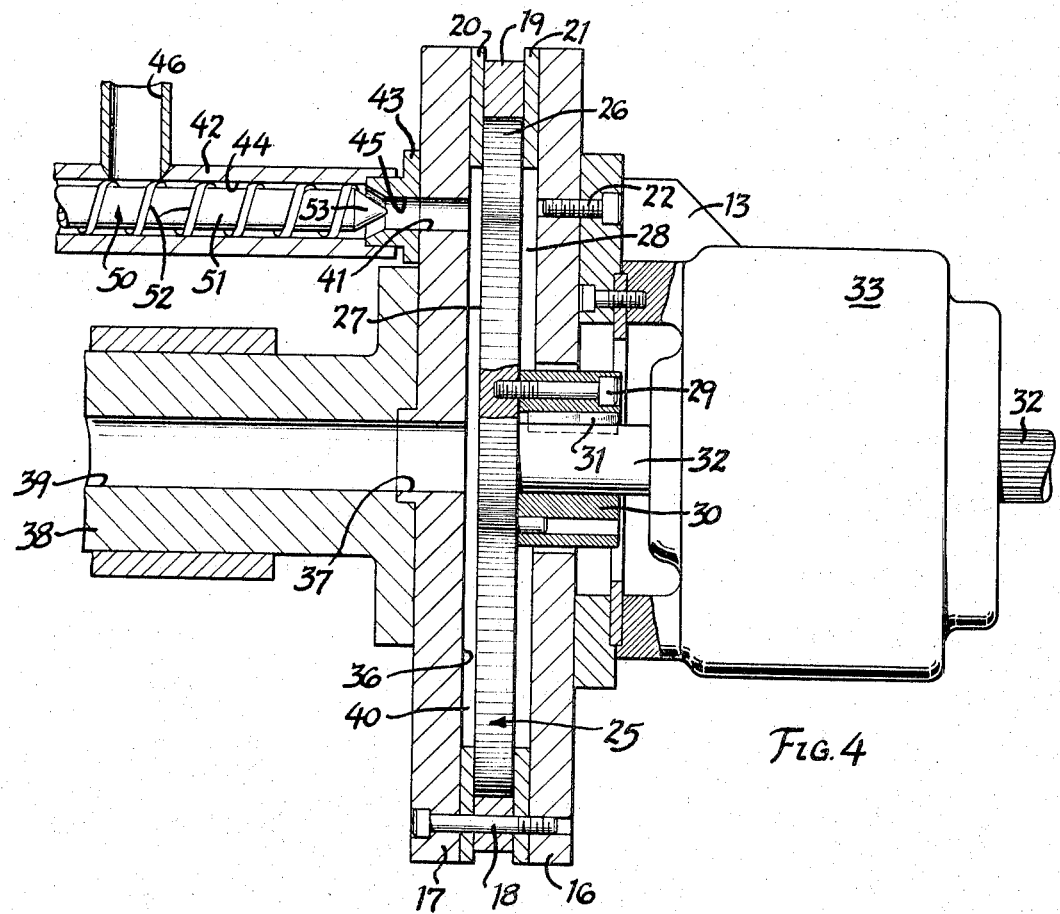
FIGURE 4 is a sectional view taken along the plane 4—4 of FIGURE 3.

In FIGURE 1, reference numeral 10 refers generally to an apparatus of the present invention, comprising a stand or support 11 having an upwardly projecting support 12 and a second, adjacent support bracket 13. Secured to the support bracket 13 is the extruder mechanism, per se, indicated generally at 15.

The extruder mechanism comprises a pair of fixed, cylindrical end plates 16, 17 interconnected by a series of peripherally spaced bolts 18. Interposed between the plates is a central, annular ring 19, a spacer 20 interposed between the ring 19 and the front plate 17, and a second spacer 21 interposed between the ring 19 and the rear plate 16. The rear plate 16 is secured to the bracket 13 by suitable means, as by bolts 22. The assembly of the rear plate 16, the front plate 17, the ring 19 and the spacers 20, 21 is fixedly secured in position by means of the brackets 13 and the base 11.

Also interposed between the plates 16, 17 is a rotatable, generally cylindrical plate 25, this plate having its exterior periphery 26 closely peripherally confined by the ring 19 and having its front and rear faces 27, 28, spaced from the front and rear plates 16, 17 by the spacers 20, 21, respectively. The plate 25 has secured thereto, as by bolts 29, an annular drive ring 30 keyed, as by element 31, to a drive shaft 32, this shaft being supported in and journaled by a bearing (not shown) within a bearing housing 33, the shaft 32 projecting rearwardly beyond the bearing housing 33 to be driven by suitable means, as by a change speed gear set (not shown) supported by the support 12, and an electric motor encased within a housing 35.

From FIGURE 4 is will be noted that the interior surface 36 of the front plate 17 is provided with a central outlet opening or orifice 37 communicating with an outlet extension 38 having an interior passage 39 registering with the orifice 37. This orifice 37 communicates with a gap 40, defined between the spaced confronting faces 27, 36 of the rotatable plate 25 and the fixed plate 17, respectively. This gap 40 defines the "melt chamber" and relative rotation between the confronting faces 27, 36 defining the chamber will cause unplasticized material introduced thereinto to be plasticized by the visco-elastic effect generated in the gap 40.

Figure 3:
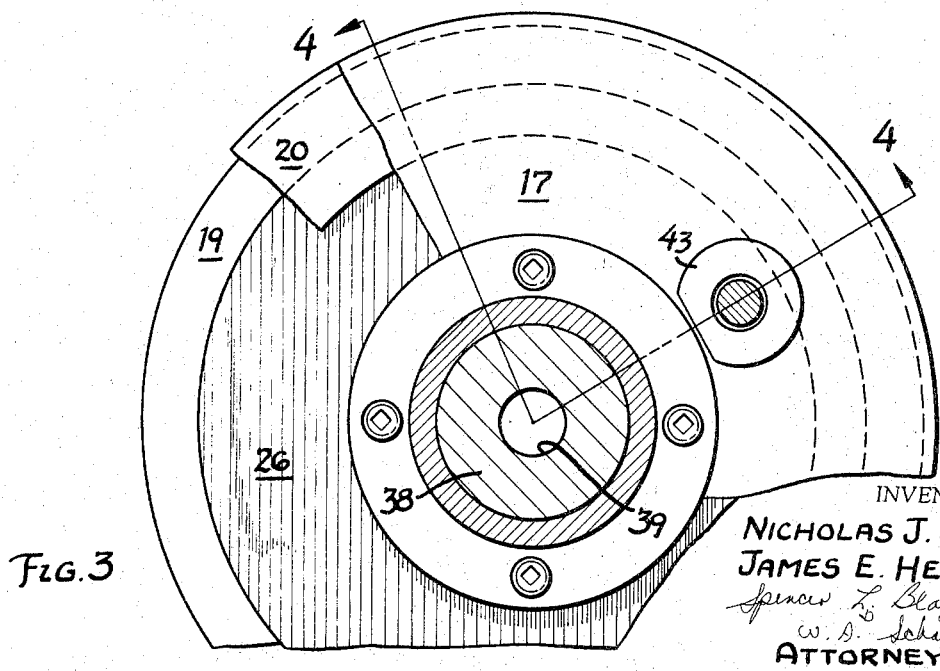
FIGURE 3 is an end elevational view, with parts broken away and in section, of the mechanism of FIGURES 1 and 2.

Unplasticized or particulate thermoplastic material is introduced into the gap or chamber 40 through an aperture 41 in the front or fixed plate 17. From FIGURE 3 it will be noted that this aperture 41 is located peripherally of the chamber or gap 40 and further, it will be noted that the aperture is cylindrical about an axis parallel to the axis of the orifice 37, and further parallel to the axis of the shaft 32, i.e., the axis of relative rotation of the plates 17, 25.

This aperture 41 communicates with a conduit or "barrel" 42 which is fixed to the plate through a mounting block 43, the barrel 42 having an axial passage 44 therethrough registering with the aperture 41 and communicating therewith through an aperture 45 in the block 43. The conduit passage or bore 44 communicates through a radial supply passage 46 and a flexible conduit or hose with an overhead supply hopper or storage unit 48. Disposed in the passage 44 is a rotatable screw indicated generally at 50, and comprising a cylindrical central portion 51 surrounded by a helical raised thread 52, and terminating at its forward end in a tapered nose portion 53 projecting into the mounting block 43. This screw is driven in any suitable manner, as by a sheave 54 mounted on that portion of the screw projecting beyond the barrel 42, a drive belt 55 and an electric motor 56.

In the operation of the device heretofore described it will be obvious that actuation of the motor 56 will drive the screw 50 in a direction such that material introduced into the barrel passage 44 from the hopper 48, through the conduit 47 and the passage 46 will be advanced by the screw to be displaced thereby through the mounting block passage 45 and the aperture 41, directly into the gap or melt chamber 40. The plasticized material thus will be introduced at a peripheral portion of the chamber 40, and rotation of the rotatable plate 25 by means of the motor 35 will advance the material spirally through the chamber to exit through the orifice or outlet opening 37 in a plasticized condition.

The utilization of the aperture 41 and the screw 50 to introduce material into the chamber 40 yields all of the desired results heretofore described. It has been found that the output of an elastic melt extruder of given size can be materially increased by the positive feeding of particulate material thereto. Further, the consistency of operation, due to the consistency of feeding, is greatly improved. The system can be utilized with many different materials, in many different physical forms, and even flake material, the most difficultly feedable material, can be readily utilized.

Further, the use of the feeding means further aids in the operation of the device in that the material is introduced into the chamber 40 with sufficient momentum to force the material across the space between the relatively rotatable faces, 27, 36, the material impinging directly upon the rotatable face 27, so that the material is immediately conveyed away from the feeding location so that more material can be introduced into the gap 40. Thus, the exertion of the visco-elastic effect upon the material can start instantaneously upon its introduction into the gap 40. Further, the forcible feeding of the particulate material in a direction toward the rotatable face 27 avoids the formation of a conglomerate ball of unplasticized, partially plasticized, and plasticized material, which has plagued operators of elastic melt extruders since the inception of the device.

By introducing the material through the barrel or conduit 42, in a single direction, i.e., normal to the rotatable face 27, and parallel to the axis of rotation of the disc 25, and impinging the material in its unplasticized state directly upon the rotatable face, the material instantaneously changes direction from its former straight line motion to the spiral motion necessary to visco-elastic operation. The material, entering the melt chamber in a direction parallel to the axis of rotation, is deflected into a direction normal to the direction of rotation only after the material is in the melt chamber. Consequently, there will be no feeding interruption, no accumulation of material at the aperture 41, and no hindrance of the entry of subsequent material.

Consistent, large volume delivery of material can be obtained with remarkably small feed elements. For example, by the use of a 1.5 inch diameter, constant pitch conveying screw driven by one-half horsepower, direct current motor at 430 revolutions per minute, 420 pounds per hour of unplasticized material can be introduced into the gap 40. All of this material was adequately plasticized and issued through the orifice 37. Obviously, it is impossible to obtain any such plasticized material output by utilizing the normal feeding procedures involving introduction of the material in a radial plane and by gravity into gap 40.

Thus having described the invention what is claimed as new is:

1. In a centripetal extruder having a rotatable plate and a fixed plate in axially spaced coaxial relation defining a cylindrical melt chamber therebetween, one of said plates having an outlet orifice communicating with a central portion of the melt chamber, the improvements of a feed opening through said fixed plate located at a portion only of the periphery of said melt chamber, a cylindrical feed barrel communicating at one end with said melt chamber through said feed opening and communicating in spaced relation to said one end with a supply hopper, said feed barrel being offset radially from the axes of said plates and parallel to said axes, a feed screw rotatable in said barrel to advance thermoplastic material therethrough from said hopper through said feed opening into said melt chamber and into contact with said rotary plate opposite said feed opening, and means for rotating said feed screw.

2. In an elastic melt extruder, a rotatable plate and a fixed plate having confronting faces axially spaced and coaxial to define therebetween a melt chamber, one of said plates having an outlet orifice coaxial with said chamber and communicating therewith, means for introducing particulate thermoplastic material into said chamber comprising an inlet port in said fixed plate, said port being axially aligned with a portion only of the periphery of said rotatable plate, a feed conduit establishing communication between said inlet port and a source of particulate thermoplastic material, said feed conduit extending parallel to the axes of said plates, and screw means in said conduit for positively advancing particulate thermoplastic material through said conduit with sufficient momentum to carry the material across said melt chamber and to impinge the material directly upon the face of said rotatable plate, and means for rotating said screw means.

3. In a centripetal extruder having a rotatable plate and a fixed plate in axially spaced relation defining a cylindrical melt chamber therebetween, one of said plates having an outlet orifice opening onto said melt chamber and coaxial with the axis of rotation of said rotatable plate, the improvements of a feed opening through said fixed plate opposite a portion only of the periphery of said rotatable plate, said opening being radially spaced from and axially parallel to said orifice, a cylindrical feed barrel radially offset from and parallel to the axis of rotation of said rotatable plate and opening at one end into said melt chamber through said feed opening, means for supplying particulate thermoplastic material to said feed barrel in spaced relation to said one end thereof, a helical feed screw rotatable in said barrel to advance material therethrough into said melt chamber and into contact with said rotatable plate opposite said feed opening, and means for rotating said feed screw.

4. In a method of extruding thermoplastic material from an elastic melt extruder having a fixed plate and a rotatable plate provided with axially spaced, confronting faces defining a melt chamber therebetween, relative rotation of said plates centripetally advancing material through said chamber in a spiral path for issuance in a plasticized state through an extrusion orifice formed in one of said plates, the steps of advancing unplasticized material under positive pressure exerted by a rotating screw from a source of such material external to said chamber in a direction parallel to the axis of relative rotation of said plates, passing said unplasticized material through an opening in said fixed plate opposite a portion only of the periphery of said rotatable plate and in said direction into the melt chamber, and deflecting said material from said direction and screw into said spiral path only after said material is in said chamber by rotating said rotatable plate.

5. In an elastic melt extruder of the type wherein a fixed plate and a rotatable plate have confronting faces defining therebetween a cylindrical melt chamber in which particulate thermoplastic material is advanced centripetally to an outlet orifice concentric with the axis of rotation of said rotatable plate to be issued therethrough in a plasticized state, the improvement of a feed mechanism for introducing particulate material directly into said melt chamber, said mechanism including an aperture in said fixed plate opening directly onto said chamber in spaced relation to said orifice, said aperture being offset radially from the axis of rotation of said rotatable plate and opposite a portion only of the periphery of said rotatable plate, a conduit communicating directly with said aperture, means for supplying particulate material to said conduit in spaced relation to said aperture, and screw means in said conduit for advancing particulate material through said conduit to be expressed through said aperture into said chamber and into contact with said rotatable plate opposite said aperture.

References Cited

UNITED STATES PATENTS

| 2,572,063 | 10/1951 | Skipper | 264—176 X |
| 2,605,531 | 8/1952 | McElroy | 264—176 X |
| 2,769,201 | 11/1956 | Lorenian. | |
| 3,068,517 | 12/1962 | Blackmore. | |
| 3,153,686 | 10/1964 | Adams | 264—176 |
| 3,160,915 | 12/1964 | Wallace | 264—176 X |
| 3,262,154 | 7/1966 | Valyi. | |

ALEXANDER H. BRODMERKEL, *Primary Examiner.*

D. J. ARNOLD, *Examiner.*

J. H. WOO, *Assistant Examiner.*

UNITED STATES PATENT OFFICE

CERTIFICATE OF CORRECTION

Patent No. 3,351,694                      November 7, 1967

Nicholas J. Curto et al.

It is hereby certified that error appears in the above numbered patent requiring correction and that the said Letters Patent should read as corrected below.

Column 6, line 24, strike out "screw".

Signed and sealed this 26th day of November 1968.

(SEAL)
Attest:

Edward M. Fletcher, Jr.                      EDWARD J. BRENNER
Attesting Officer                             Commissioner of Patents